United States Patent [19]

Eguchi

[11] Patent Number: 4,864,170
[45] Date of Patent: Sep. 5, 1989

[54] LINEAR MOTOR

[75] Inventor: Naoya Eguchi, Kanagawa, Japan

[73] Assignee: Sony Corporation, Tokyo, Japan

[21] Appl. No.: 295,543

[22] Filed: Jan. 11, 1989

[30] Foreign Application Priority Data

Jan. 27, 1988 [JP] Japan ................................. 63-16270

[51] Int. Cl.[4] ........................................... H02K 33/18
[52] U.S. Cl. .................................... 310/12; 360/78.13
[58] Field of Search ................ 310/12, 14, 23, 30; 360/78.13; 384/18

[56] References Cited

U.S. PATENT DOCUMENTS 4,654,940  4/1987  Hidano ................................. 384/18

FOREIGN PATENT DOCUMENTS 0010961  1/1986  Japan .................................... 310/12
0178151  8/1987  Japan .................................... 310/12
0077366  4/1988  Japan ................................. 310/12

*Primary Examiner*—Patrick R. Salce
*Assistant Examiner*—Judson H. Jones
*Attorney, Agent, or Firm*—Lewis H. Eslinger; Jay H. Maioli

[57] ABSTRACT

A moving coil type linear motor in which yokes disposed opposite to magnets magnetized in the thickness direction thereof penetrate through-holes of a bobbin on which a coil is wound that is energized to generate the magnetic flux which intersects the magnetic flux of the magnets, and the bobbin is moved along the yokes by energizing the coil, wherein a guiding portion for guiding a rolling element including balls, for example, is provided in the surfaces of the respective yokes which do not face the magnets and the through-holes of the bobbin, to thereby support the bobbin on the yokes through the rolling elements.

24 Claims, 7 Drawing Sheets

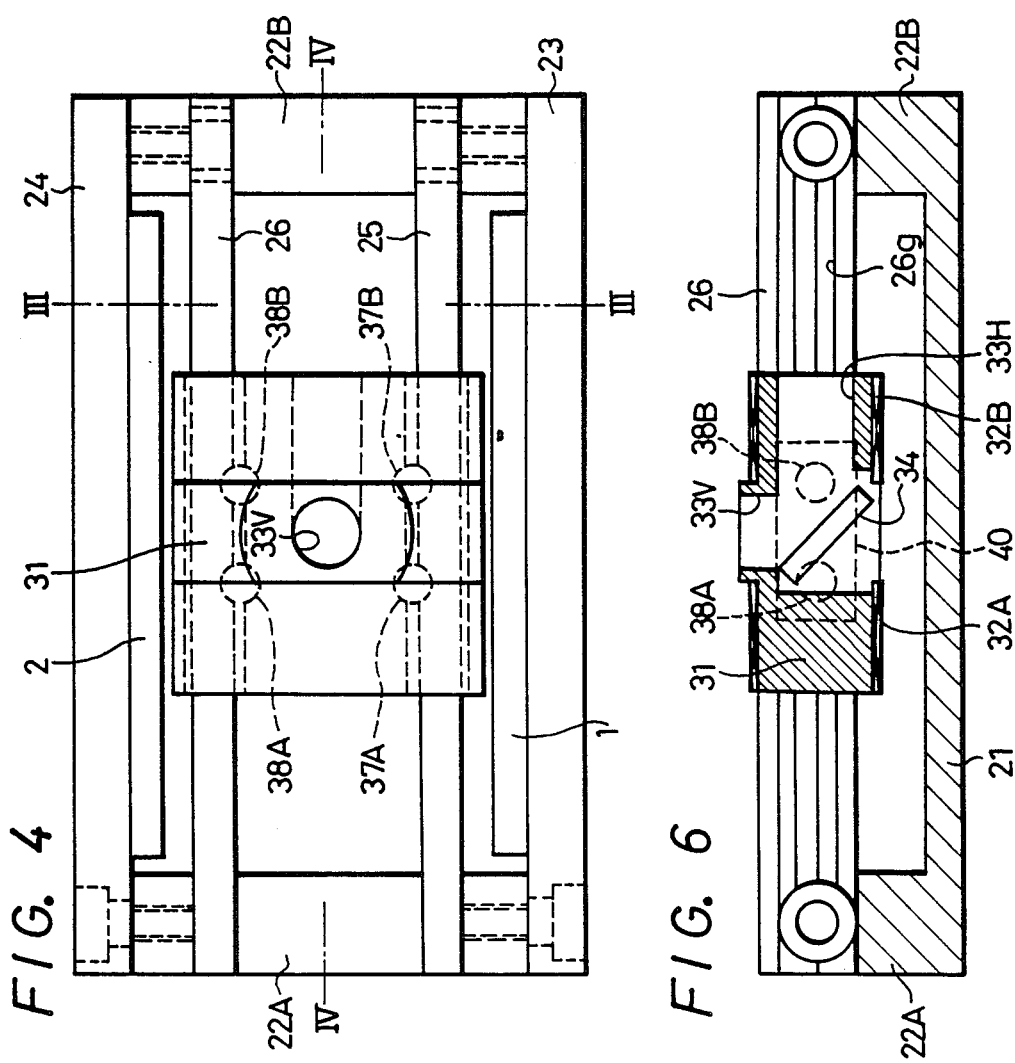

LINEAR MOTOR

BACKGROUND OF THE INVENTION

1. Field of the Invention

This invention relates to a moving coil type linear motor.

2. Background of the Invention

Conventionally, there is known a moving coil type linear motor as shown in FIGS. 1 and 2.

In FIGS. 1 and 2, reference numerals 1 and 2 respectively designate magnets each magnetized in the thickness direction thereof and which are fixed to the insides of the yokes 3 and 4 which have their both ends bent such that the same polarity faces each other. Yokes 5 and 6 both penetrate a bobbin 8 on which a moving coil 7 is wound and yokes 5 and 6 are integrated with the yokes 3 and 4 to form a Fig. 8 shape extended in the lateral direction. Reference numeral 11 designates a slide base plate, and on its bottom face there is fixed the coil 7 through a supporting member 9. The slide base plate 11 is provided with slide bearings 12 and 13 on the both sides thereof with which guiding shafts 14 and 15 are engaged.

In the above-mentioned construction, energization of the coil 7 leads to an intersection of a current flowing in the coil 7 and the flux of the magnets 1 and 2 to thereby generate a thrust which moves the coil 7 and consequently the slide base plate 11 in the direction a or the direction b. Such linear motor is employed as, for example, an optical pickup moving device or the like of an optical disc player.

In the above-mentioned conventional linear motor, since the coil 7 for generating the thrust is supported by the guiding shafts 14 and 15 through the slide base plate 11, the whole size and weight of the moving section are large and accordingly the thrust/weight ratio is small, thereby making it impossible to produce a high acceleration. Further, a low mechanical resonance frequency of the moving system causes the frequency bandwidth of the servo system to be narrow.

For this reason, the conventional linear motor has a problem that stable operation at high speed is difficult.

OBJECTS AND SUMMARY OF THE INVENTION

In view of the above-mentioned problem, it is an object of the present invention to provide a small and light linear motor which operates stably at a high speed.

According to a first aspect of the present invention, there is provided a moving coil type linear motor in which a yoke arranged opposite to a magnet magnetized in the thickness direction thereof penetrates a through-hole of a bobbin on which a coil is wound, and the coil is adapted to be energized to drive the bobbin, the linear motor is characterized in that the yoke and the through-hole of the bobbin are respectively provided with a guiding portion for a rolling element, and the bobbin is supported on the yoke through the rolling element.

According to a second aspect of the present invention, there is provided a linear motor comprising:

a first yoke to which a pair of magnets magnetized in the thickness direction thereof are attached;

second and third yokes which are attached to the first yoke so as to respectively oppose the pair of magnets; and a bobbin provided with a coil wound thereon for generating magnetic flux which intersects the magnetic flux from the magnets and is formed with a pair of through-holes which are respectively penetrated by the second and third yokes, wherein the second and third yokes and the through-holes of the bobbin are each provided with a guiding portion for a rolling element through which the bobbin is supported on the second and third yokes.

The above and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 3 and 4 are respectively a perspective view and a plan view showing the construction of a first embodiment of a linear motor according to the present invention;

FIGS. 5 and 6 are cross-sectional views showing the construction of the first embodiment of the present invention;

DETAILED DESCRIPTION OF THE PREFERRED EMBODIMENTS

A first embodiment of a linear motor according to the present invention, which is applied to an optical disc apparatus, will hereinafter be explained with reference to FIGS. 3–7.

Figure 1:
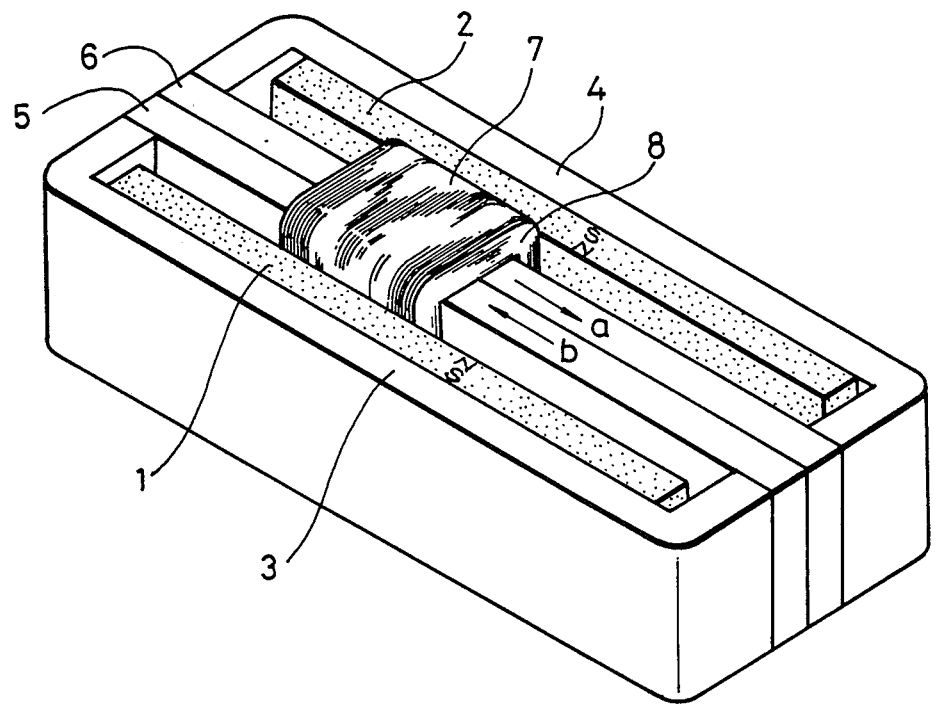
FIGS. 1 and 2 are respectively a perspective view and a cross-sectional view showing the construction of a prior art linear motor.
Figure 2:
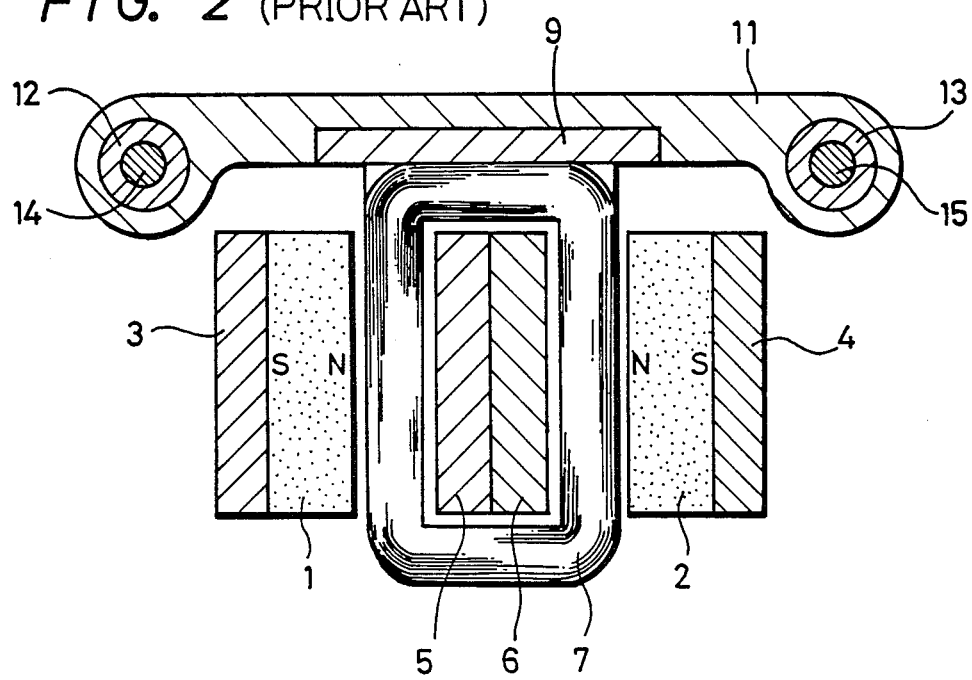
Figure 3:
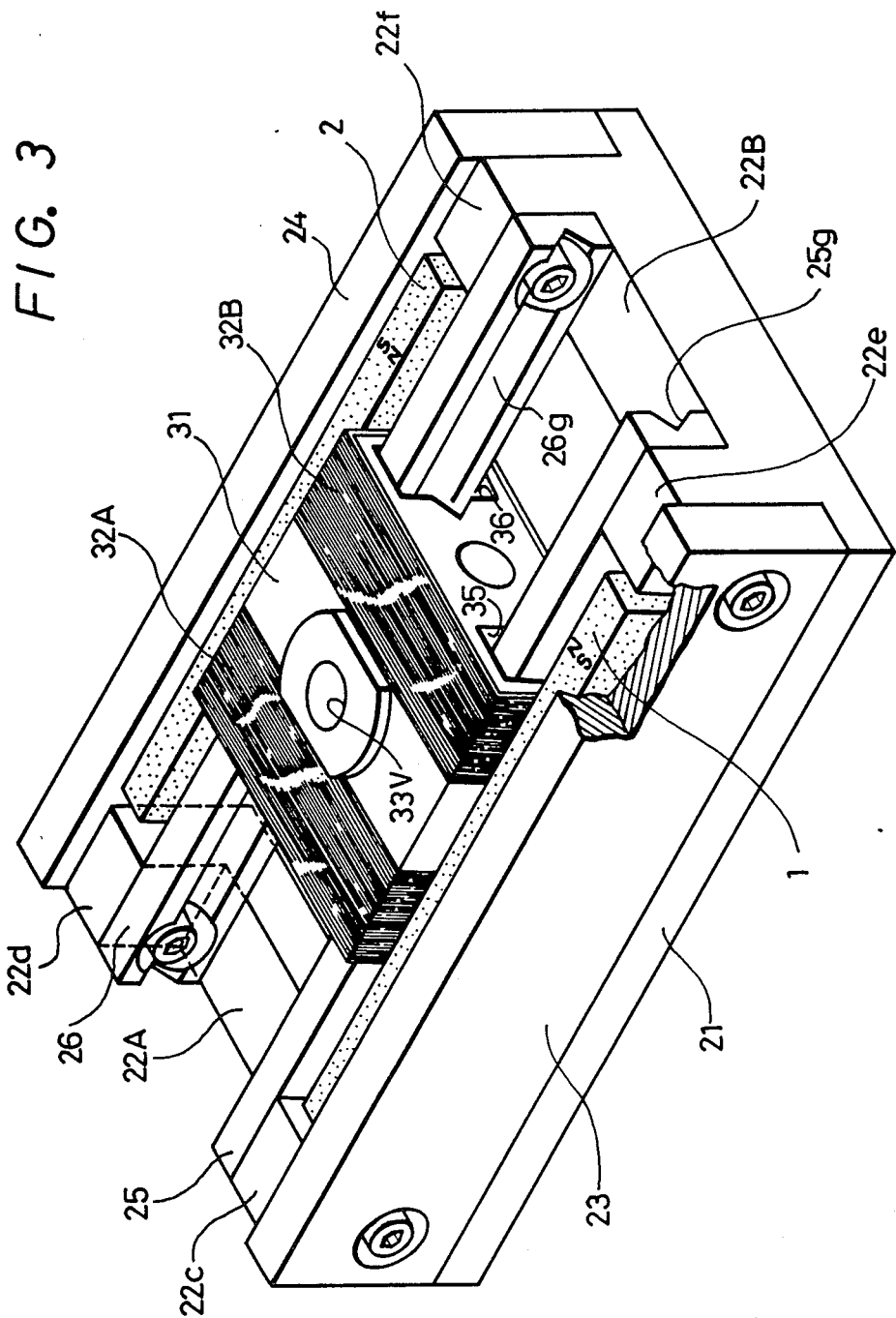
Figure 7:
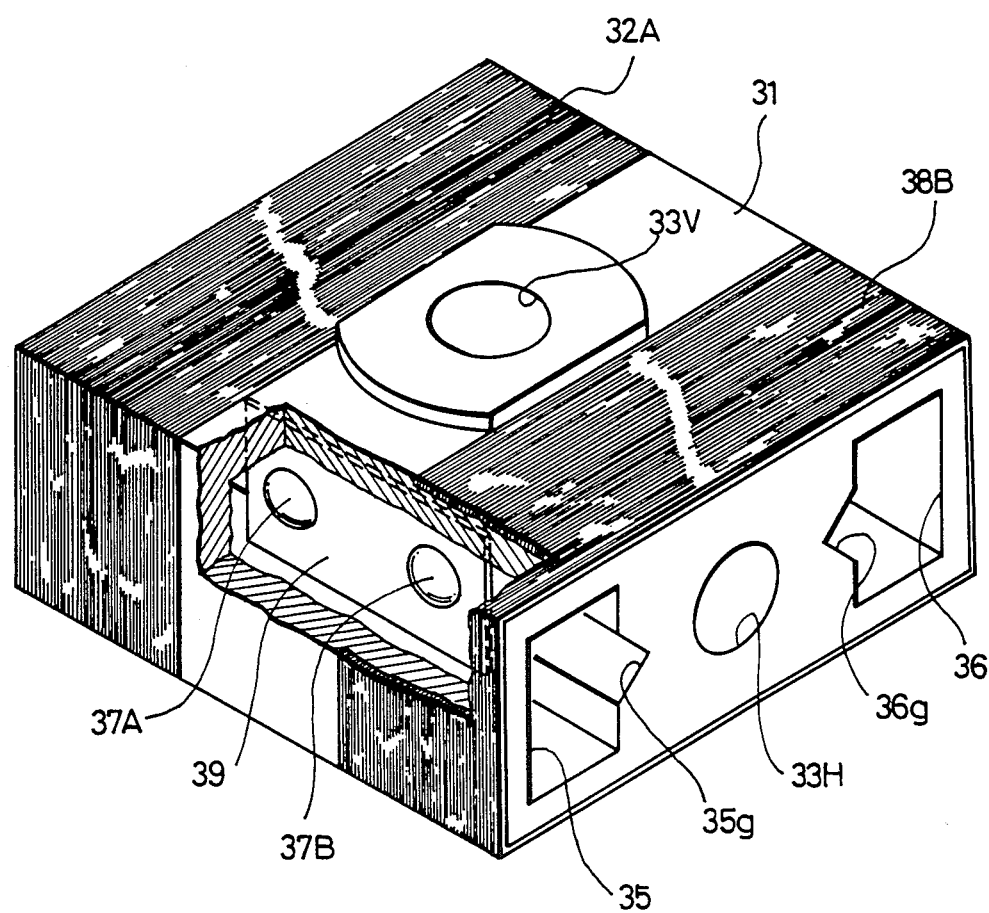
FIG. 7 is a perspective view showing a main portion of the present invention.

The construction of the first embodiment of the present invention is shown in FIG. 3 and FIGS. 4–6, and the construction of its main portion in FIG. 7.

In FIGS. 3–6, reference numeral 21 designates a rectangular base plate made of magnetic material such as low carbon steel (soft steel) which has salient portions 22A and 22B in "U" shape in cross section formed in both longitudinal end portions thereof. Magnets 1 and 2 magnetized in the thickness direction thereof are secured to yokes 23 and 24, respectively. Both ends of the yokes 23 and 24 are respectively fixed to the salient portions 22A and 22B of the base plate 21 with the magnets 1 and 2 facing inside, whereby the magnets 1 and 2 are symmetrically located.

Yokes 25 and 26 facing the magnets 1 and 2 for forming a closed magnetic loop respectively penetrate through-holes 35 and 36 of a bobbin 31, later described, and are secured to the insides of the respective end portions 22c, 22d and 22e, 22f of the salient portions 22A and 22B of the base plate 21. At this time, the upper face of the salient portions 22A and 22B of the base plate 21 is used as the reference face for fixing the yokes 25 and 26.

On the inner walls of the yokes 25 and 26, there are respectively formed guiding grooves 25g and 26g in a "V" shape in cross section.

The bobbin 31, is made of synthetic resin and formed substantially as a rectangular solid, and a pair of coils 32A and 32B are wound on both end portions thereof. At a location where an aperture 33V opening on the upper surface of the bobbin 31 crosses with an aperture 33H opening on one of its side faces, a reflecting mirror 34 is disposed with inclination of 45° as shown in FIG. 6, to form an optical path passing through the apertures 33V and 33H between the objective lens of the optical pickup, the beam splitter and so on which are omitted in the drawing.

As shown in FIG. 7, on the inside wall surfaces of the through-holes 35 and 36, guiding grooves 35g and 36g equally formed in a "V" shape are respectively provided, opposite to the guiding grooves 25g and 26g of the yokes 25 and 26.

Within this guiding groove 35g, engaged are a pair of balls 37A and 37B with a predetermined spacing maintained therebetween by a supporting plate 39. The other guiding groove 36g is also arranged in the same manner.

As described above, the through-holes 35 and 36 of the bobbin 31 are penetrated by the yokes 25 and 26, respectively and the guiding grooves 25g and 26g on the yoke side are opposite to the guiding grooves 35g and 36g on the bobbin side, respectively.

The spacings between the yokes 25 and 26 and between the through-holes 35 and 36 are appropriately determined, so that, as shown in FIGS. 4 and 5, balls 37A, 37B, and 38A, 38B of a predetermined diameter are gripped between the guiding grooves 35g and 36g on the bobbin side and the guiding grooves 25g and 26g on the yoke side. Although omitted in the drawing, there are arranged cover plates for preventing the balls from dropping in a manner that they cover a part of the through-holes 35 and 36 of the bobbin 31.

The diameter of the balls 37A–38B is selected in accordance with the required moving distance of the bobbin 31.

Since each ball rotates with the movement of the bobbin 31, the moving distance of the center of the balls is $\frac{1}{2}$ the moving distance of the bobbin 31.

Thus, in the first embodiment, the bobbin 31 is supported on the yokes 25 and 26 through respective pairs of balls 37A, 37B and 38A, 38B. In other words, the yokes 25 and also for 26 are utilized for formation of a magnetic circuit and guiding of the bobbin 31, so that members used exclusively for guiding, which have conventionally been required, are not necessary.

Therefore, in the linear motor of the first embodiment, the moving section is almost the bobbin 31 itself so that it is immensely reduced in size and weight compared with prior art examples. Thus, the linear motor of the present embodiment is provided with a higher thrust/weight ratio obtained by energizing the coils 32A and 32B, thereby making it possible to produce high acceleration. Also, the mechanical resonance frequency of the moving system is made high and therefore the frequency bandwidth of the servo system becomes wider, so that its response becomes quicker. Accordingly, by a combination of high acceleration ability and quick response, the movement of the moving section over a predetermined distance is stably carried out in a short time, whereby a so-called high-speed access is enabled when utilized in an optical disc apparatus.

Incidentally, in the above described embodiment, a pair of balls are employed for each of the through-holes in the bobbin 31, however, it is also possible to support the bobbin 31 by a total of three balls by using only one ball in any one of the through-holes.

Although the linear motor of the first embodiment can produce a remarkable effect that the bobbin 31 can be reduced in size and weight by utilizing the yokes 25 and 26 as the guiding shafts so that a stable operation at high speed can be obtained, it is necessary to finish the V-shaped guiding grooves 25g, 26g, 35g and 36g for guiding the balls 37A, 37B, 38A and 38B interposed between the bobbin 31 and the yokes 25 and 26 with profile irregularity of approximately 0.2 μm–0.5 μm. Such fine finishing requires high precision and an increased number of working processes, thereby presenting the problem that the manufacturing cost thereof is elevated.

Now, a detailed explanation will be given to a second embodiment which is provided for solving the above problem as well as achieving the same objects and effects as the first embodiment with reference to FIGS. 8 and 9. It should be noted that the parts corresponding to those in the first embodiment will be designated with the same reference numerals and detailed explanation thereof will be omitted.

Figure 8:
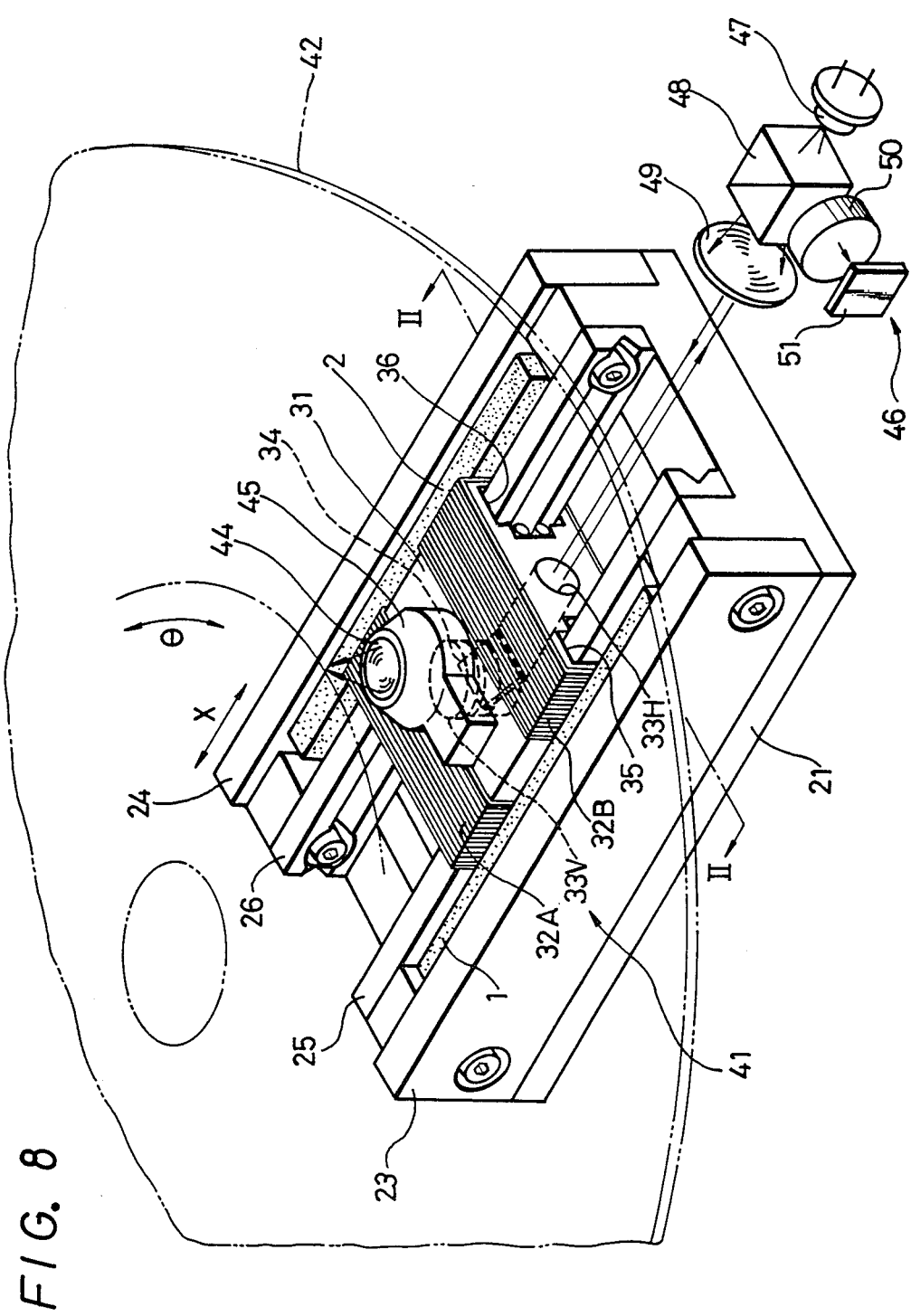
FIG. 8 is a perspective view showing a second embodiment of a linear motor according to the present invention.
Figure 9:
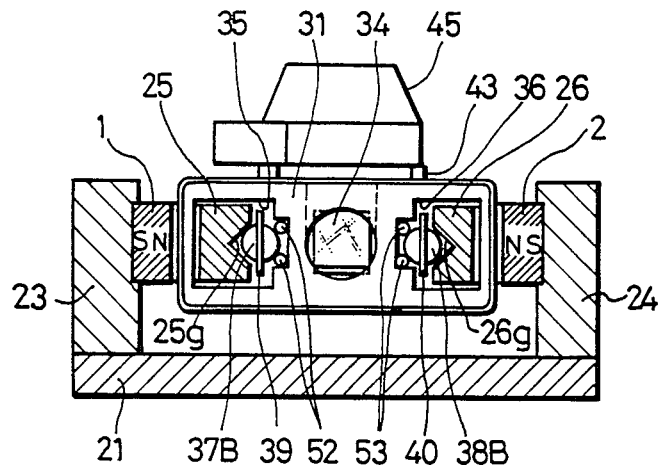
FIG. 9 is a cross-sectional view taken along a line II—II of FIG. 8.

FIGS. 8 and 9 show that a moving coil type linear motor of the second embodiment is employed as a means for moving the objective lens of an optical pickup provided in an optical disc apparatus. In FIGS. 8 and 9, reference numeral 41 generally designates a linear motor of the second embodiment which is disposed on the rear surface side of an optical disc 42 mounted for rotation in the direction $\theta$. The linear motor 41 is constructed such that yokes 25 and 26 made of magnetic material are respectively disposed opposite to magnets 1 and 2 magnetized in the thickness direction thereof and respectively penetrate through-holes 35 and 36 formed through the bobbin 31 on which coils 32A and 32B are wound. The bobbin 31 may have a central portion made of metal such as aluminum or the like as long as at least its outer peripheral portion is made of non-magnetic material. L-shaped holes 33V and 33H are formed through a location of the bobbin 31 between the pair of through-holes 35 and 36. A reflecting mirror 34 for changing the direction of the optical path is fixed at a location where the holes 33V and 33H cross with each other. Further, a moving portion (for example, a focus adjusting mechanism and so on) of an optical pickup 45 having an objective lens 44 is attached through a mount 43 to the exit side of the hole 33V. An optical system 46, which comprises a laser diode 47, a beam splitter 48, a collimator lens 49, a light receiving optical system 50, photo diode 51 and so on, is aligned with the axis of the hole 33H.

Figure 10:
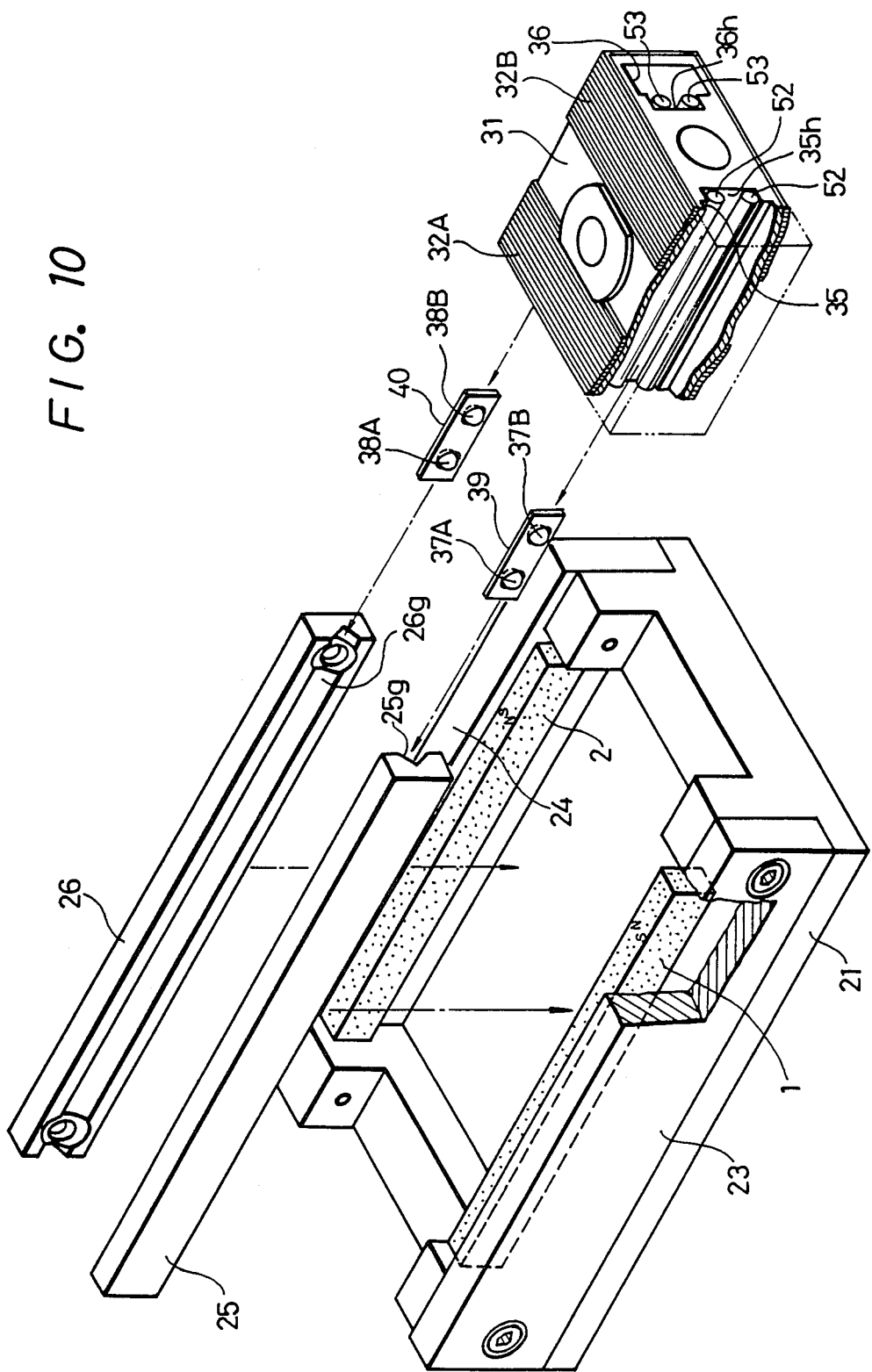
FIG. 10 is a partially cut-away exploded perspective view of the linear motor shown in FIG. 7.

In the linear motor 41 of the second embodiment, as shown in FIG. 10, grooves 35h and 36h are formed on the inner side walls of the respective through-holes 35 and 36 of the bobbin 31 and each are respectively provided with a pair of shafts 52 and 53 attached on the inner side walls thereof. V-shaped guiding grooves 25g and 26g are formed on the plane of the respective yokes 25 and 26 opposite to the shafts 52 and 53. These shafts 52 and 53 are obtained by polishing ordinary rods made of ceramics, stainless steel or the like and fixed on the inner side walls of the respective guiding grooves 35h and 36h, for example, by a bonding agent. Then, a pair of balls 37A and 37B are interposed between the pair of shafts 52 and the guiding groove 25g of the yoke 25 with an interval maintained constant by a holder 39. Also, a pair of balls 38A and 38B are interposed between the pair of shafts 53 and the guiding groove 26g of the yoke 26 with an interval maintained constant by a holder 40. These balls are preferably made of non-magnetic material such as stainless steel, ceramics, ruby, sapphire or the like.

In the second embodiment, the bobbin 31 is supported by the yokes 25 and 26 through the balls 37A, 37B, 38A and 38B, so that the yokes 25 and 26 form a closed magnetic path with the yokes 23 and 24 attached to the base 21 as well as serve as guiding shafts for the bobbin 31. Therefore, it is not necessary to additionally provide a slide base for guiding shafts for the bobbin 31, so that the bobbin 31 of the second embodiment can be further reduced in size and weight, thereby making it possible to stably drive it at high speed along the longitudinal direction (the direction X indicated in FIG. 8) of the yokes 25 and 26. It means that the linear motor of the second embodiment, if applied to an optical disc apparatus, can provide a faster access.

Also, in the linear motor of the second embodiment, the balls 37A, 37B, 38A and 38B are respectively guided by the pairs of shafts 52 and 53 in the pair of through-holes 35 and 36 of the bobbin 31. These shafts 52 and 53 are available from a selection of extremely highly accurate shafts mass-produced at a low cost. Therefore, it is not necessary to provide the pair of through-holes 35 and 36 of the bobbin 31 with highly accurate polished guiding grooves extending over the whole longitudinal length thereof on their inner side walls, thus making it possible to correspondingly reduce the number of the working process steps and the manufacturing cost.

Figure 11:
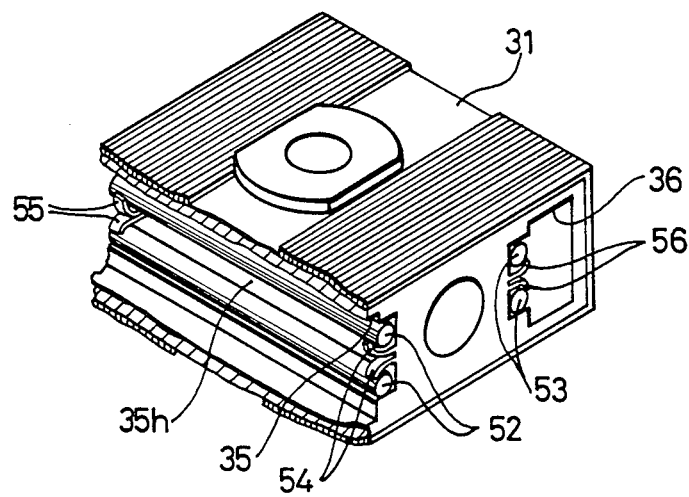
FIG. 11 is a partially cut-away perspective view of a modified example of the second embodiment.

The shafts 52 and 53 shown in FIG. 8 are fixed on the inner side walls of the respective grooves 35h and 36h by a bonding agent. However, they may be fixed as shown in FIG. 11. Specifically, in the example of FIG. 11, the inner portion of the bobbin 31 is made of non-magnetic light metal and the both ends of the groove 35h of the through-hole 35 of the bobbin 31 are provided with protrusions 54 and 55, respectively. These protrusions 54 and 55 are bent by a tool, not shown, after the pair of the shafts 52 are attached on the inner side wall of the groove 35h, whereby the pair of the shafts 52 are stably maintained. In the same manner, the groove 36h of the through-hole 36 of the bobbin 31 is provided at the both ends thereof with protrusions 56 and 57 (the protrusion 57 is not shown in FIG. 11), and the pair of the shafts 53 are fixed by bending the protrusions 56 and 57.

Figure 12:
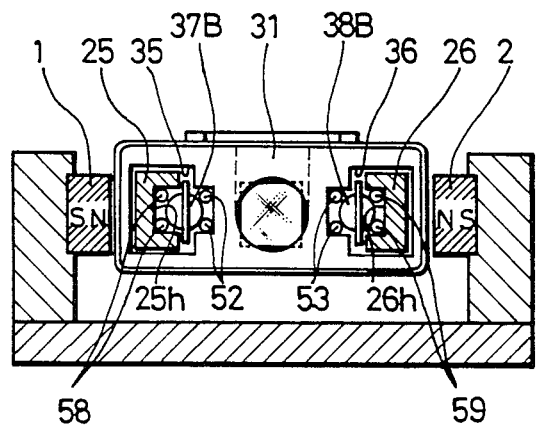
FIG. 12 is a cross-sectional view showing a third embodiment of a linear motor according to the present invention.

Next, a third embodiment of the linear motor according to the present invention will be explained with reference to FIG. 12. As illustrated in FIG. 12, a groove 25h is formed on the inner side wall of the yoke 25 opposite to the pair of the shafts 52 fixed on the inner wall of the through-hole 35 formed through the bobbin 31, and a pair of shafts 58 are attached to the groove 25h. Thus, pair of balls 37A and 37B are interposed between the pair of shafts 52 and the pair of shafts 58. In the same manner, a groove 26h is formed on the inner wall of the yoke 26, and a pair of shafts 59 are attached to the groove 25h. Then, the pair of balls 38A and 38B are interposed between the pair of shafts 53 on the bobbin side and the pair of shafts 59 on the yoke side. Thus, the bobbin 31 is movably supported by the yokes 25 and 26 through the pairs of balls 37A, 37B and 38A, 38B. The rest of the construction of the third embodiment is the same as the second embodiment shown in FIG. 8 so that the detailed explanation thereof will be omitted.

According to the third embodiment shown in FIG. 12, since the guiding planes for the balls 37A, 37B, 38A and 38B are all formed of relatively inexpensive, commercially available shafts 52, 58, 53 and 59, it is not necessary to form highly accurate guiding planes over the whole longitudinal length of the yokes 25 and 26, thereby presenting an advantage that the manufacturing cost can be further reduced.

Additionally, the number of balls interposed between the bobbin 31 and the yokes 25 and 26 may be changed, for example, two balls can be utilized on the side of the yoke 25 and one ball on the side of the yoke 26.

As described above in detail, according to the present invention, the through-holes of the bobbin on which the coils are wound and the yokes penetrating the through-holes are provided with the guiding grooves for the rolling elements, the bobbin is supported on the yokes through the rolling elements, so that the yokes which are constitutent members of the magnetic circuit can be utilized for guiding the bobbin, thereby making it possible to reduce the moving section in size and weight and accordingly provide a moving coil type linear motor which operates stably at a high speed.

The above description is given on preferred embodiments of the invention but it will be apparent that many modifications and variations could be effected by one skilled in the art without departing from the spirit or scope of the novel concepts of the invention so that the scope of the invention should be determined by the appended claims only.

I claim as my invention:

1. A moving coil type linear motor in which a yoke arranged opposite a magnet magnetized in the thickness direction thereof passes through a through-hole formed in a bobbin on which a coil is wound, said coil being adapted to be energized to drive said bobbin, said linear motor characterized in that said yoke and the through-hole of said bobbin each respectively include a guiding portion for cooperating with a rolling element, and said bobbin is supported for linear movement relative to said yoke through said rolling element.

2. A linear motor according to claim 1, wherein said yoke is a flat, longitudinally extending member and said guiding portion of said yoke is formed on a plane of said yoke that does not face said magnet.

3. A linear motor according to claim 1, wherein said guiding portion formed in said yoke and said guiding portion in said bobbin are respectively formed in a manner that each of said guiding portions maintains point contact with said rolling element.

4. A linear motor according to claim 3, wherein said guiding portion is formed in said bobbin having a concave profile and extends along the moving direction of said bobbin, said guiding portion of said bobbin being in point contact with said rolling element.

5. A linear motor according to claim 3, wherein said guiding portions are formed in said yoke and in said bobbin, respectively so that each guiding portion contacts said rolling element in at least two points on said respective guiding portion.

6. A linear motor according to claim 5, wherein at least one of said guiding portions formed in said yoke and said bobbin, respectively, is a groove, the cross-section of said groove being substantially a V-shape.

7. A linear motor according to claim 6, wherein the other of said guiding portions formed in said yoke and said bobbin, respectively, is a second groove, the cross-section of said second groove being substantially a V-shape.

8. A linear motor according to claim 5, wherein at least one of said guiding portions formed in said yoke and in said bobbin, respectively, includes a pair of members having circular cross section and being in contact with said rolling element.

9. A liner motor according to claim 8, wherein said at least one guiding portion is formed as a groove and said pair of members comprise shafts disposed in said groove.

10. A linear motor according to claim 8, wherein the other of said guiding portions formed in said yoke and in said bobbin, respectively, is a second groove, the cross-section of said second groove being substantially a V-shape.

11. A linear motor according to claim 8, wherein the other of said guiding portions formed in said yoke and in said bobbin, respectively, includes a second pair of members having circular cross section and being in contact with said rolling element.

12. A linear motor according to claim 1, wherein said rolling element includes a pair of balls, at least the surface of said pair of balls having a non-magnetic property.

13. A linear motor according to claim 1, wherein said rolling element includes a pair of balls and a holder for maintaining an interval between the balls constant.

14. A linear motor comprising:
a first yoke;
a pair of magnets magnetized in the thickness direction thereof and attached to said first yoke;
second and third yokes attached to said first yoke so as to respectively oppose said pair of magnets;
a bobbin provided with a coil wound thereon and adapted for generating magnetic flux which intersects the magnetic flux from said magnets and formed with a pair of through-holes which are respectively penetrated by said second and third yokes; and
a plurality of rolling elements wherein said second and third yokes and said through-holes of said bobbin are each provided with a guiding portion for cooperating with a respective rolling element through which said bobbin is supported on said second and third yokes.

15. A linear motor according to claim 14, wherein said second and third yokes are elongate bars and said guiding portions of said second and third yokes are formed on longitudinal planes of said respective yokes which do not face said magnets.

16. A linear motor according to claim 14, wherein said guiding portions formed in said second and third yokes and in said bobbin have a shape so that said guiding portions contact a respective one of said rolling elements with point contact.

17. A linear motor according to claim 16, wherein said guiding portions are formed such that said guiding portions are in contact with said rolling elements in at least two points on each guiding portion.

18. A linear motor according to claim 17, wherein at least one of said guiding portions in said second and third yokes and in said bobbin is formed as a groove, the cross-section of said groove being substantially a V-shape.

19. A linear motor according to claim 18, wherein the other of said guiding portions formed in said second and third yokes and in said bobbin is formed as a second groove, the cross-section of said second groove being substantially a V-shape.

20. A linear motor according to claim 17, wherein at least one of said guiding portions formed in said second and third yokes and in said bobbin includes a pair of members having circular cross section and being in contact with a respective one of said rolling elements.

21. A linear motor according to claim 20, wherein the other of said guiding portions formed in said second and third yokes and in said bobbin has a second pair of members having circular cross section and being in contact with a respective one of said rolling elements.

22. A linear motor according to claim 20, wherein said at least one of said guiding portions formed in said second and third yokes and in said bobbin is formed as a groove and said pair of members of circular cross section comprises a pair of shafts disposed in said groove.

23. A linear motor according to claim 14, wherein said plurality of rolling elements comprises a pair of balls, at least the surface of said pair of balls having a non-magnetic property.

24. A linear motor according to claim 23, wherein said plurality of rolling elements includes a holder for maintaining the interval between said balls constant.

* * * * *

UNITED STATES PATENT AND TRADEMARK OFFICE
CERTIFICATE OF CORRECTION

PATENT NO. : 4,864,170

DATED : September 5, 1989

INVENTOR(S) : Naoya Eguchi

It is certified that error appears in the above-identified patent and that said Letters Patent is hereby corrected as shown below:

Col. 3, line 7, after "31" delete ","

line 35, after "37B" delete ","

Col. 5, line 33, after "accurate" insert --and--

In Claims:

Col. 7, line 13, change "liner" to --linear--

Signed and Sealed this

Twenty-first Day of August, 1990

*Attest:*

HARRY F. MANBECK, JR.

*Attesting Officer*      *Commissioner of Patents and Trademarks*